Patented May 3, 1927.

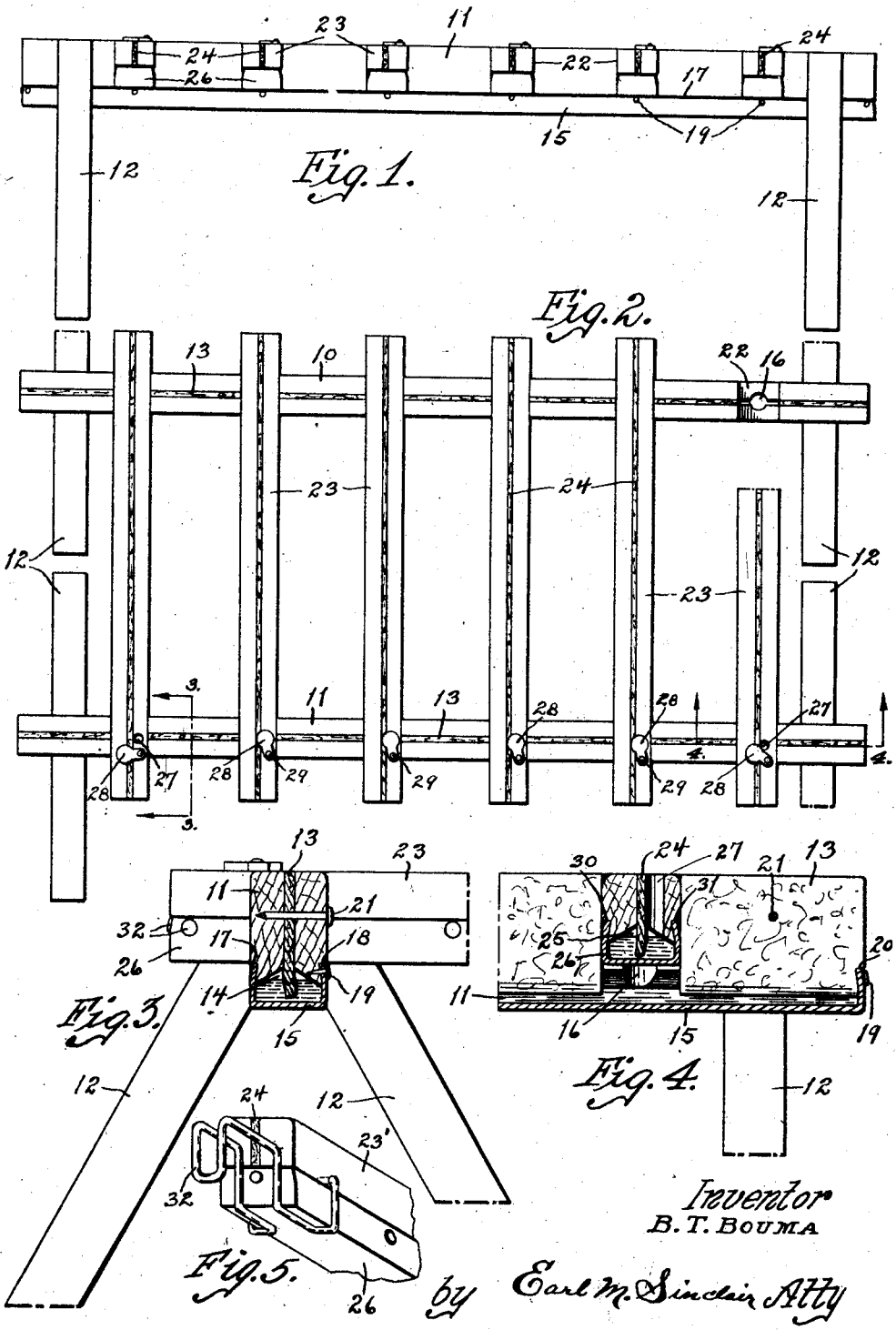

1,627,268

UNITED STATES PATENT OFFICE.

BENJAMIN T. BOUMA, OF LYNNVILLE, IOWA.

POULTRY ROOST.

Application filed February 13, 1925. Serial No. 9,061.

This invention is an improvement on the devices illustrated, described and claimed in Letters Patent of the United States Number 1,246,705, granted to me November 13, 1917, and has for its primary object to provide an improved construction for sanitary poultry roosts in which more effective means is provided for preventing the entrance of dirt and other foreign matter to the pans holding the disinfectant material.

A further object of the present invention is to simplify the construction, especially with respect to the mounting of the perch bars in the sills, and to provide improvements in the means for filling the pans with disinfectant.

My invention consists in the construction, arrangement and combination of elements hereinafter set forth, pointed out in the claim and illustrated by the accompanying drawing, in which—

Figure 1 is a side elevation of a poultry roost embodying my improvements. Figure 2 is a plan view of the same, portions being broken away. Figure 3 is an enlarged cross-section on the line 3—3 of Figure 2, and Figure 4 is an enlarged longitudinal section on the line 4—4 of the same view. Figure 5 is a detail perspective view showing a different means for supporting a perch bar.

In the construction of the devices as shown the numerals 10, 11 designate parallel sills, which may be supported in any suitable manner, as by means of legs 12. Each sill 10, 11 preferably consists of two elongated strips of wood or other suitable material between which is disposed a longitudinally extending strip 13 of felt, fibre board or other suitable absorbent material, known as the wick. At their lower inner margins the strips comprising the sills 10, 11 are beveled, cut away or grooved, whereby a channel 14 is formed at the base of and extending below the wick. Mounted below each sill 10, 11, and embracing the lower portion thereof, is a pan 15, which pan also encloses the channel 14 and the lower portion of the wick 13, which may extend below the lower margins of the sills and below the channels 14. Near the end of each sill is formed an opening 16 which communicates with the channel 14 thereof and through which a suitable liquid disinfectant may be introduced to the pans 15. The disinfectant is retained by the pans, and the wicks 13 normally extend into the disinfectant in the pans and draw it upwardly between the strips comprising the sills. The sides of the sills 10, 11 are in this instance formed with longitudinally extending grooves 17, 18, into which the upper side margins of the pans 15 extend, and said pans are held in place by means of tacks or small nails 19 driven through them and into the strips of the sills. The overhanging upper edges of the grooves 17, 18 protect and cover the upper margins of the pans and prevent the entrance of dirt and foreign matter thereto. The pans also may be fitted closely to the ends of the sills as shown in Figure 4, and the ends of the sills may be formed with grooves 20 into which the end margins of the tops of the pans extend. The sills 10, 11 are provided with nails such as 21 extending through the strips and the wicks 13 to hold the parts together.

Each sill 10, 11 is formed with a series of spaced upwardly opening notches 22, in alinement in the two sills, and in these notches perch bars 23 are adapted to be removably and replaceably mounted, whereby they are supported by and between the sills. Each perch bar 23 preferably is formed in a manner similar to the sills, of two strips of wood separated by a wick 24 extending downwardly into a channel 25 extending lengthwise at the bottom of the bar, which is embraced by a pan 26 to hold the disinfectant and pass it to the wick. In each perch bar is formed one or more vertical filling holes 27 extending from its top to and communicating with the channel 25 and forming a means for introducing the disinfectant to the pans. The filling holes 27 are normally covered by means of pieces 28 of tin or the like attached by a nail or tack 29 in such manner that they may be turned aside to disclose the hole for the filling operation, but when in normal position cover such holes so that dirt and the like cannot enter.

The filling holes 16 for the sills preferably are formed at the bottom of the notches 22 nearest one end of the sill, and normally they are covered by a perch bar such as 23 and the entrance of foreign substances is thereby prevented, the perch bar being removed temporarily for the filling operation.

This roost may be made of any desired size, with any desired number of perch bars, each of any desired length. The perch bar preferably is of somewhat smaller dimensions than the supporting sills, and the said perch bars also have the longitudinal grooves 30, 31 in their sides, with overhanging upper edges into which the edges of the pans 26 are received and held by nails or tacks 32.

In Figure 5 the perch bar 23' is formed with the grooves in its sides to receive the edges of the pan 26, as above described. A supporting hook 33 is formed of a single piece of wire and is attached to the end of the bar by having its ends embedded in the sides thereof and then bent to extend along the bottom of the pan and up the end of the bar, the central portion being recurved to form a supporting hook by which the bar may be suspended from any suitable support.

I claim as my invention—

A device of the class described, comprising spaced sills adapted to contain a liquid germicide, said sills being formed with spaced notches opening to their upper margins, and perch bars mounted in said notches and also adapted to contain a liquid germicide, said sills being formed with filling holes located in certain of said notches and adapted to be covered by the perch bars when in place.

Signed at Lynnville, in the county of Jasper and State of Iowa, this 26th day of September, 1924.

BENJAMIN T. BOUMA.